United States Patent
Parker (10) Patent No.: US 9,973,813 B2
(45) Date of Patent: May 15, 2018

(54) COMMERCIAL-FREE AUDIOVISUAL CONTENT

(71) Applicant: DISH Technologies L.L.C., Englewood, CO (US)

(72) Inventor: Scott Michael Parker, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days. days.

(21) Appl. No.: 14/603,837

(22) Filed: Jan. 23, 2015

(65) Prior Publication Data

US 2016/0219330 A1 Jul. 28, 2016

(51) Int. Cl.

| | |
|---|---|
| *H04N 21/438* | (2011.01) |
| *H04N 21/44* | (2011.01) |
| *H04N 21/41* | (2011.01) |
| *H04N 21/81* | (2011.01) |
| *H04N 21/422* | (2011.01) |
| *H04N 21/472* | (2011.01) |
| *H04N 21/458* | (2011.01) |

(52) U.S. Cl.
CPC ..... *H04N 21/4383* (2013.01); *H04N 21/4122* (2013.01); *H04N 21/4126* (2013.01); *H04N 21/4135* (2013.01); *H04N 21/42204* (2013.01); *H04N 21/44008* (2013.01); *H04N 21/458* (2013.01); *H04N 21/47202* (2013.01); *H04N 21/812* (2013.01)

(58) Field of Classification Search
CPC ........... H04N 21/84; H04N 21/812; H04N 21/44008; H04N 21/4122; H04N 21/4126; H04N 21/4135; H04N 21/42204; H04N 21/47202; H04N 21/458
See application file for complete search history.

(56) References Cited

U.S. PATENT DOCUMENTS

| | | | |
|---|---|---|---|
| 8,752,084 B1 * | 6/2014 | Lai | H04H 60/375 725/14 |
| 2004/0255336 A1 * | 12/2004 | Logan | H04H 20/28 725/135 |
| 2010/0031193 A1 * | 2/2010 | Stark | G06F 17/30861 715/810 |
| 2010/0031286 A1 * | 2/2010 | Gupta | H04N 5/44543 725/38 |
| 2013/0283324 A1 * | 10/2013 | Bonfrer | H04N 21/43637 725/81 |
| 2014/0204277 A1 * | 7/2014 | Adderly | H04N 5/50 348/731 |
| 2015/0058888 A1 | 2/2015 | Cho et al. | |

* cited by examiner

*Primary Examiner* — Benjamin R Bruckart
*Assistant Examiner* — Akshay Doshi
(74) *Attorney, Agent, or Firm* — Seed IP Law Group LLP (57) ABSTRACT

A commercial-free audiovisual content system allows a viewer to select two or more audiovisual sources such as television channels to view on an audiovisual display. When the system detects that a commercial is being displayed in the audiovisual content of the channel presented on the main part of the screen, the system will immediately switch to display the audiovisual content of another source that is not displaying a commercial.

20 Claims, 6 Drawing Sheets

| Select | Source | Description | Priority |
|---|---|---|---|
| ☒ | 104 | Local ABC News | A |
| ☒ | 105 | Local NBC News | B |
| ☒ | 107 | Local CBS News | B |
| ☒ | 109 | Local PBS News | C |
| ☒ | 113 | Local FOX News | B |
| ☐ | VOD-1 | Nightly News Report | ☐ |
| ☐ | DVR 3-13 | The Daily Show 11/1/2014 | ☐ |
| ☐ | DVR 2-1 | Local ABC News 11/1/2014 | ☐ |

| Select | Source | Description | Priority |
|---|---|---|---|
| ☒ | 662 | CNBC Squawk Box | B |
| ☒ | 668 | Bloomberg TV | A |
| ☒ | 702 | Fox Business News | C |
| ☒ | 708 | CBS Financial Channel | C |

Financial News ▼

COMMERCIAL-FREE AUDIOVISUAL CONTENT

BACKGROUND

Technical Field

The disclosure relates to the field of audiovisual content display, and, in particular, to a service that switches between multiple audiovisual content sources to only display content that has no commercials.

Description of the Related Art

Audiovisual content display systems, such as home entertainment systems associated with a set-top box and a subscription service such as DirecTV™ and Dish Network™, are able to provide hundreds, if not thousands, of audiovisual channels for a user to view on a television display. Frequently, set-top boxes are able to receive multiple channels at the same time and to display the audiovisual content carried on these multiple channels on the user's television display in multiple windows. For example, the technology of split screen or picture-in-picture allows two or more channels containing audiovisual content to be displayed to a viewer simultaneously.

BRIEF SUMMARY

In one implementation, a commercial-free audiovisual content system allows a viewer to select two or more channels to view on an audiovisual display such as a television display. The audiovisual content of one channel will be displayed on the main part of the screen, and the additional channels will each be represented by one or more small video icons which may be, for example, to the side, top, bottom or any part of the main screen, or hidden behind the main screen. When the system detects that a commercial is being displayed in the audiovisual content of the channel presented on the main part of the screen, the system will immediately switch to another channel that is not displaying a commercial.

A commercial-free audiovisual content system may be used in a number of different scenarios. For example, on a Saturday afternoon watching sports shows across multiple channels, the system would switch between channels as commercials appear in the programming. In another example, before leaving for work on a weekday morning, a viewer may want to watch the programming across several local television news channels to get a complete understanding of local news that may be relevant to the viewer's commute or local business conditions. The system would switch between channels as commercials appear in the programming. This way, the viewer would always be presented with the audiovisual content related to morning news.

This system is also applicable to video-only and audio-only content that may contain commercials.

DETAILED DESCRIPTION

Figure 1:
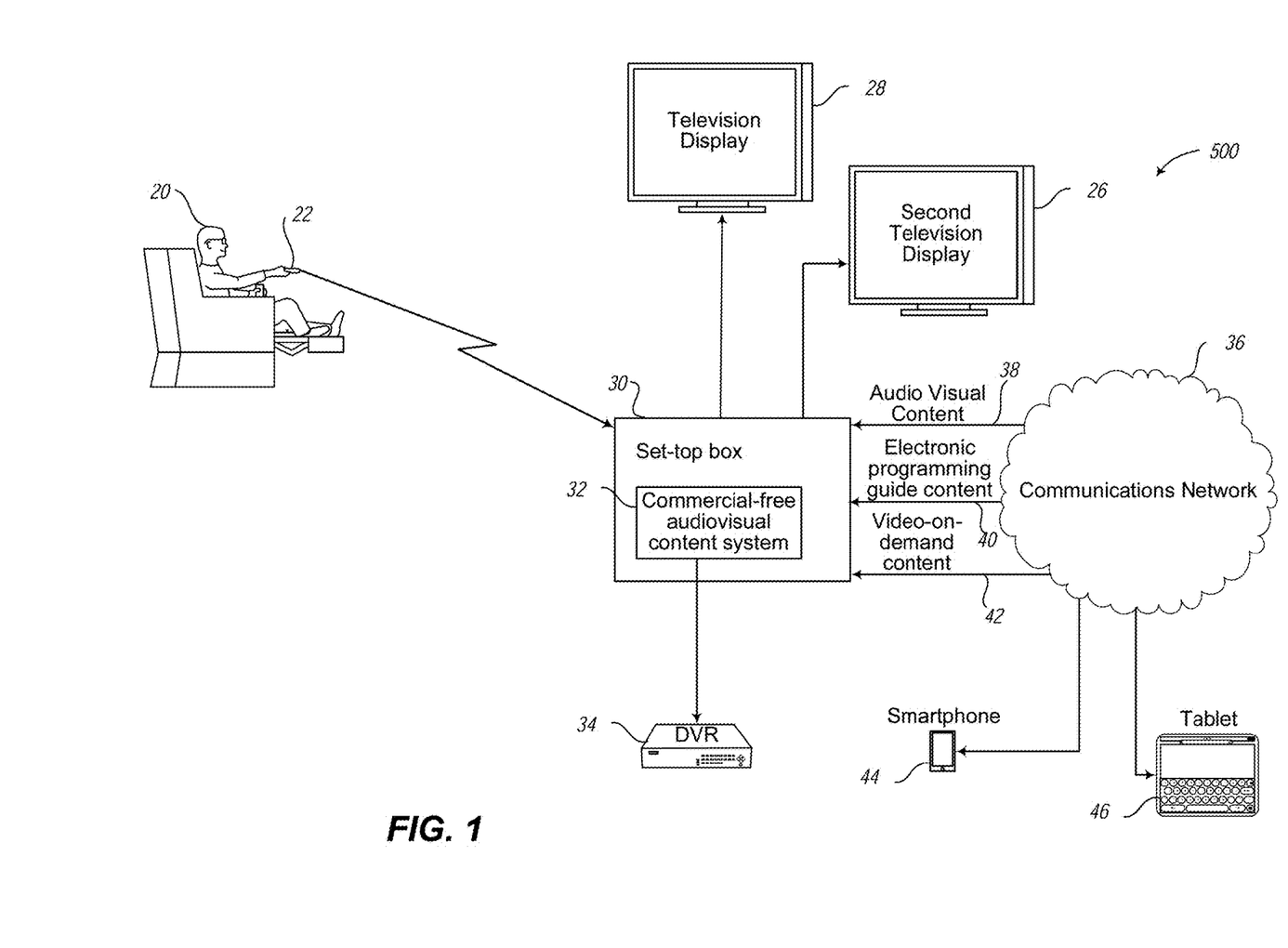
FIG. 1 contains diagram 500 that shows an implementation of a system that provides commercial-free audiovisual content.

FIG. 1 contains diagram 500 that shows an implementation of a system that provides commercial-free audiovisual content. In this implementation, a user 20 uses a remote control device 22 to control a set top box that is running a commercial-free audiovisual content system 32. In other implementations, the commercial-free audiovisual content system 32 may be operating in a separate receiving device and implemented using either hardware, software or a combination of both, and may be located at the user's 20 location or at a remote location, for example at a remote server computer. In other implementations, a secondary audiovisual display such as television display 26 may also be connected to the set-top box 30. In still other implementations, the functionality of the commercial-free audiovisual content system 32 may also be available in a smart phone 44, in a tablet 46 or other similar device that is able to display audiovisual content.

Various data comes from a communications network 36 to the set-top box 30 that contains the commercial-free audiovisual content system 32. Examples of this data include audiovisual content 38, electronic programming guide content 40, and video-on-demand content 42. In one or more implementations, the set-top box 30 will communicate this and other data over the communications network 36.

Audiovisual content 38 that comes over the communications network 36 may come from a content distributor such as DirecTV™ or Dish Network™ as a part of a subscription service, or as broadcast content. This audiovisual content 38 is typically live content that is being streamed to the set-top box 30 over hundreds if not thousands of channels. Individual audiovisual programs over each individual channel may include movies, series episodes, documentaries, commercials, news broadcasts, sports events, musicals, cartoons and the like. The electronic programming guide content 40 identifies, for each timeslot and each channel, the name and information for the audiovisual content that is scheduled to be streamed.

Other audiovisual content data may come from other sources, for example from a digital video recorder device 34 which may have audiovisual content programs stored on it that have been received by the set-top box 30 based on commands received from the user 20. For example, the user 20 may have specified certain movies or series programs that are streamed in the future to be recorded on the digital video recorder 34 for multiple viewings. In another example, streamed audiovisual content 38 may be recorded on digital video recorder 34 in a "time-shifted" manner to allow the user 20 to view the program at a later time and then delete it after viewing. For instance, the user 20 may wish to record primetime series episode content that is streamed live between 7 and 10 PM every weeknight on certain channels, and then to view each of the recorded programs at a later time before deleting them from the digital video recorder 34. In some implementations, the digital video recorder 34 is a component within the set top box 30.

Another form of audiovisual content may be video-on-demand content 42 that is available from the communications network 36. Audiovisual content titles available on video-on-demand, typically movies, sports events or series episodes, are typically displayed in a catalog format that allows the user 20 to browse to desired titles. A user 20 may use a remote control device 22 to navigate through the catalog and identify video-on-demand content the user 20 wishes to view on the television display 28. Typically, audiovisual content available through video-on-demand 42 contains commercials embedded within the audiovisual content.

Sources for audiovisual content may also come from the Internet, for example YouTube™, Hulu™, WIGS™ and other internet locations. Content from these sources may also contain commercials.

In one implementation of the commercial-free audiovisual content system 32, the user 20 is able to select two or more sources of audiovisual content from one or more of the different sources described above, for example two different television channels. This selected audiovisual content is then displayed on the television display 28 in a sequential fashion, starting with a program on the first channel that will play until a commercial is detected, and then the presentation will cycle to the other channel and display the program on that channel until a commercial is detected in that program, at which point the first channel is cycled to. There are number of variations in implementations of how the different programs are cycled through. For example, in one implementation a program will be displayed until a commercial is detected, and then the presentation is cycled to another program for display until the commercial in the first program is completed. In another example, if all of the programs have simultaneous commercials, then the system 32 will display a default audiovisual content source, such as a preferred channel.

In one or more other example implementations, when a program streamed on a selected source that is not being displayed is presenting content that is not a commercial, then that program is recorded on the digital video recorder 34. If that source is selected as part of cycling through sources as commercials appear in other program content, the content displayed to the user 20 would begin with the unviewed recorded content on the digital video recorder 34. For example, a first channel showing a college football game is played until a commercial is shown, in which case the system 32 cycles to a second channel showing an NFL game, but continues to record the first channel showing the college game after the commercial in the first channel is over. The second channel showing the NFL game continues to be displayed until a commercial is detected on the second channel, at which time the system 32 begins to display the recorded content of the college game on the first channel and begins to record the second channel after the commercial on the second channel is over.

The analysis of an audiovisual content stream to determine when a commercial is being played on the stream is known in the art and involves one or more of special algorithms including video recognition, voice recognition and other video stream analysis.

In one or more implementations, the user 20 may enable the commercial-free audiovisual content system 32 in different ways. In one implementation, the system may be enabled for a time period within a day, for example between 5 AM and 8 AM on a weekday mornings, where the commercial-free audiovisual content system 32 will cycle through selected channels and audiovisual content and present only commercial-free content. For example, the user 20 may specify a time period in a number of different ways: using the remote control 22 in conjunction with a menu system displayed on the television display 28, using a smart phone 44, a tablet 46 or other input device.

In another implementation, the user 20 may specify an event, such as a "breaking news" event, that may interrupt a regularly-scheduled audiovisual broadcast content to present a newsworthy item in a local area that may have media coverage by more than one channel. For example, storm weather warnings, major traffic accidents, school closures, or national or worldwide events that would be particularly relevant to the user 20, and the user 20 would want to get all relevant information related to that event that may be covered by more than one channel. In this example, the user 20 would want to cycle through program coverage on multiple channels without spending any time looking at commercials in order to get all information associated with the "breaking news" event.

In yet another implementation, the user 20 may manually activate the system by using the remote control 22 in conjunction with a menu system displayed on the television display 28. In other variations, the user 20 could use a smart phone 44, a tablet 46 or other input device.

In one or more implementations, the user 20 may select audiovisual content sources (e.g., channels) that are to be cycled through in one or more ways. In one example, the user 20 may individually select each channel that is to be cycled through as a part of the commercial-free audiovisual content system 32. This may be done, for example, through a selection of channels using remote control 22 within a menu system displayed on television display 28, or similar selections using a smart phone 44 or a tablet 46.

In other implementations, audiovisual content sources may be selected based on an event as described above. For example, for a "breaking news" event that involves a local disaster, news channels local to the user may be exclusively selected and cycled through. In another example, a national "breaking news" event that is remote to the user may cause 24-hour news channels to be exclusively selected and cycled through.

In still other implementations, channels may be selected based on content type. For example, if it is Saturday afternoon and the user 20 wants to watch sports programming, the commercial-free audiovisual content system 32 can select all channels from a content subscription service that are displaying sports content at that time and start to cycle through those channels. Or, if it is Friday night and the user 20 wants to watch comedies, the commercial-free audiovisual content system 32 will select all channels that can stream comedy content such as movies, comedy specials or comedy standup, and will cycle through those channels. In some implementations channels are added and removed from the cycle as the content type of the programming on the available channels changes.

Figure 2A:
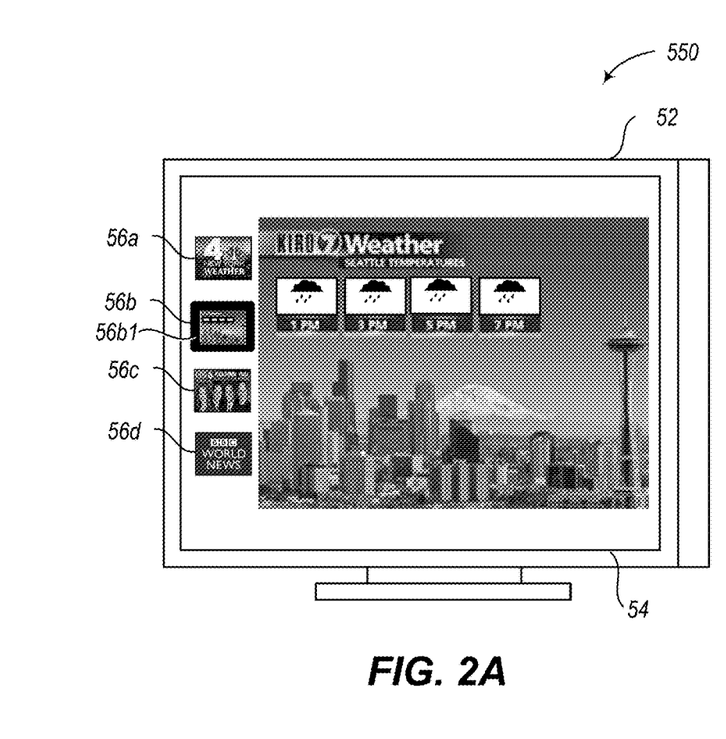
FIG. 2A contains illustration 550 that shows an implementation of a user interface that provides commercial-free audiovisual content.

FIG. 2A contains diagram 550 that shows an implementation of the commercial-free channel system 32 that is displaying one of four channels in a commercial-free environment. An audiovisual display, such as television display 52 contains a main display area 54 that is positioned to the right of four thumbnail icons 56a, 56b, 56c, 56d, each representing one of the four channels that are part of the commercial-free audiovisual content system 32. Display area 54 displays the current contents of one of the channels that is being presented without commercial content. In this implementation, the thumbnail icon 56b that is associated with the content displayed on display area 54 is highlighted with a bold frame 56b1. In other embodiments, the displayed content may be indicated by the thumbnail icons 56a, 56b, 56c, 56d in various ways, including but not limited to highlighting, increasing or decreasing the size, rendering in color versus black and white, adjusting the brightness or contrast, using animation effects, adjusting the position of one or more of the thumbnail icons 56a, 56b, 56c, 56d or other similar ways of distinguishing the icon.

Figure 2B:
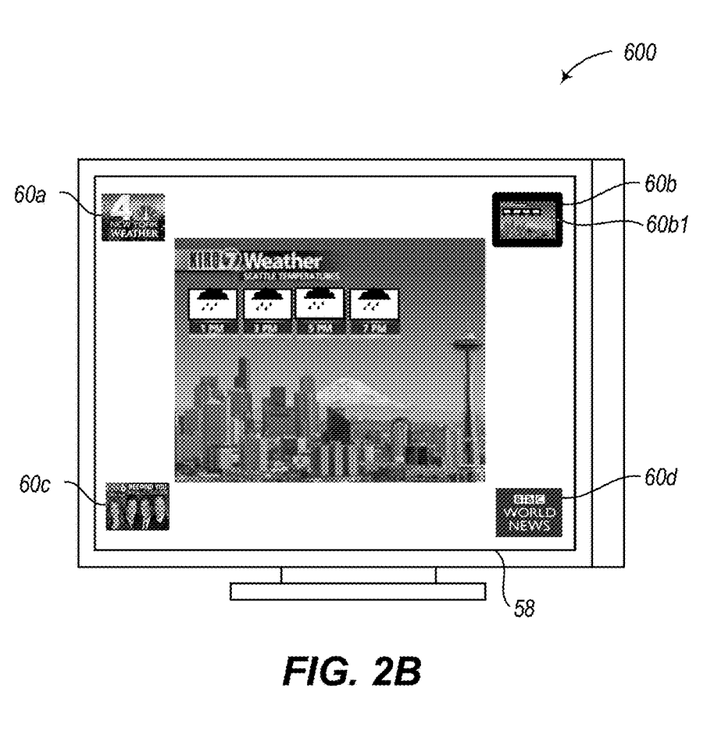
FIG. 2B contains illustration 600 that shows another implementation of a user interface that provides commercial-free audiovisual content.

FIG. 2B contains diagram 600 that shows another implementation of the commercial-free audiovisual content system 32 that is displaying one of four channels in the commercial-free environment. In this implementation, a display area 58 displays the current contents of one of the channels being presented without commercial content. Thumbnail icons 60a, 60b, 60c, 60d are displayed on top of the display area 58. The thumbnail icon 60b that indicates the content being displayed on the display area 58 is highlighted with a bold frame 60b1. In one or more variations of this implementation, the user 20 may reorder, move, hide, restore, or otherwise manipulate the thumbnail icons 60a, 60b, 60c, 60d with respect to the display area 58. This includes moving the icons relative to each other, and moving the location of the main display relative to the icons. The individual thumbnail icons 60a, 60b, 60c, 60d may contain an indication of the source of the content, for example the channel number, video-on-demand identifier, or digital video recorder recording identifier.

In some implementations, the user 20 may switch between icons to change the audiovisual content display area 58 by using commands sent by remote control 22 or through some other interaction with the system. In this way, the user is able to "swap," using picture-in-picture terminology, between audiovisual content displays represented by the thumbnail icons. In addition, the user may use other trick play commands from remote control 22 to pause, skip back, skip forward, or resume content that is being displayed on display area 58 or is being streamed that is represented by any of the individual thumbnail icons 60a, 60b, 60c, 60d. The thumbnail icons may indicate those channels are live, paused (on hold), time shifted or otherwise delayed. The user 20 can select an audiovisual content source and request that it "resume live."

In other implementations, the icons may contain a reduced display of the audiovisual contents for the channels that are represented by each icon. In one or more variations of this implementation, the user 20 may notice the content on a non-displayed channel, be interested in switching immediately to that channel, and indicate the switch, for example, by using remote control 22. For example user 20 may be watching local news in the morning and has a primary news channel on display 58 because the user prefers the news anchors on that channel. If the user notices that one of the thumbnail icons 60c is showing an interview with a celebrity the user 20 is interested in, the user 20 uses remote control 22 to select the thumbnail icon 60c that will display the audiovisual content represented by that channel on the display area 58. In this example, the commercial-free audiovisual content system 32 will continue to display the content on display area 58 until a commercial is detected, at which time another audiovisual source will be selected.

In yet another implementation, the size of the display area 58 and thumbnail icons 60a, 60b, 60c, 60d are adjusted so that one or more of the content sources would have their programming displayed in a roughly equal size, allowing the user 20 to treat the thumbnails as a picture-in-picture display with the audio associated with the active source being played. The commercial-free audiovisual content system 32 would then cycle between the sources to present the highest priority commercial-free content.

In still another implementation, the user 20 may use the remote control 22 to identify an audiovisual source (e.g., channel) that is not to be switched, even if commercials are displayed in the programming on that source.

Figure 3A:
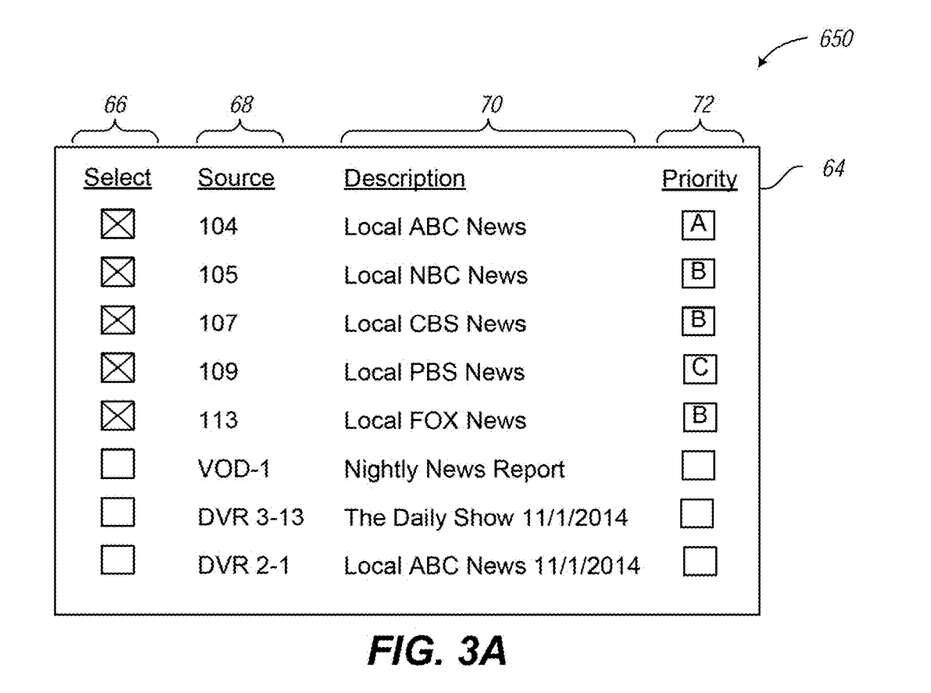
FIG. 3A contains illustration 650 that shows an implementation of the selection of a group of morning news audiovisual content.

FIG. 3A contains diagram 650 that shows one non-limiting implementation of a user interface for selecting audiovisual sources (e.g., channels) to be cycled through using the commercial-free audiovisual content system 32. In a display area 64, four columns are shown that allow the user 20 to view and select those sources to be used to cycle through in the commercial-free audiovisual content system 32. The "Select" column 66 allows the user to select one or more rows of audiovisual content sources. The "Source" column 68 indicates the source from which audiovisual content may be taken. The "Description" column 70 gives a brief text description of the type of content that is being displayed by the source at that time. The "Priority" column 72 allows the user to give priority to each of the selected audiovisual content sources. For example, a higher priority "A" would indicate that the audiovisual content source should have the highest preference of being displayed; a priority of "B" indicates the next highest preference; and so on. As described above, in one implementation the highest priority audiovisual content source will be initially displayed on the television display 28 until a commercial is detected, at which time the next highest priority audiovisual content source will be displayed. In one or more variations of one or more implementations, the user 20 will be able to modify the selection of an audiovisual content source and its priority while the commercial-free channel system 32 is in operation, for example by changing the selections within display area 64, or by selecting a thumbnail icon (FIG. 2B 60a) and changing the options within that selection (not shown).

Figure 3B:
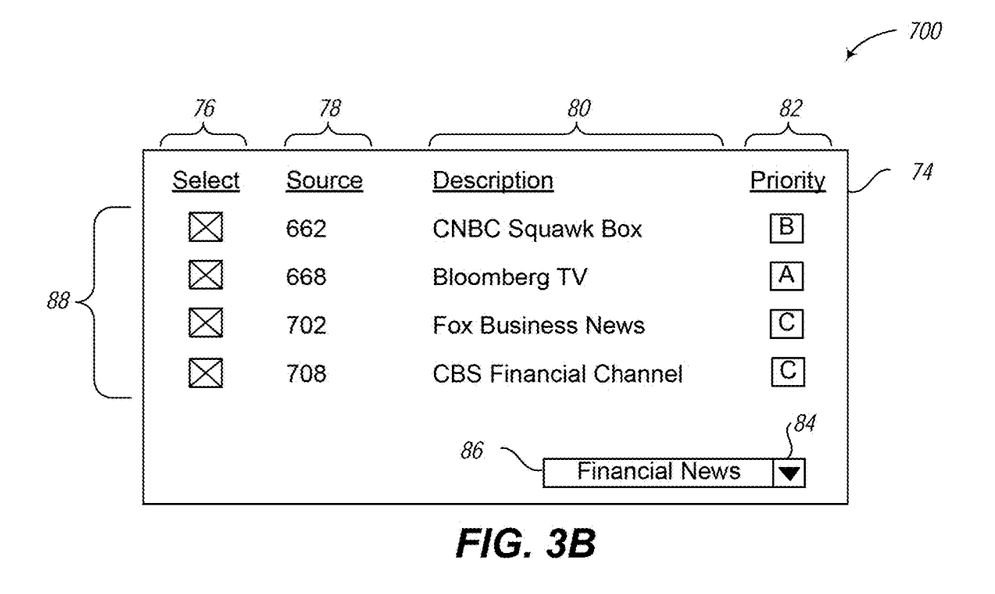
FIG. 3B contains illustration 700 that shows an implementation of the selection of a group of financial audiovisual content.

FIG. 3B contains diagram 700 that shows another non-limiting implementation of a user interface for selecting channels to be cycled through using the commercial-free audiovisual content system 32. The display area 74 shows four columns 76, 78, 80, 82 are shown that allow the user 20 to view and select those channels to be cycled through as described above for FIG. 3A. In this example, there is a drop-down box 84 that is part of the display area 74 that allows the user 20 to select categories of audiovisual content to be selected and cycled through. In this example, the topic "Financial News" 86 is selected, which results in the four rows 88 of matching audiovisual content sources related to financial news to be displayed to the user 20. In variations of this implementation, the commercial-free audiovisual content system 32 will identify the priority of each source, or the user 20 will enter the desired priority in manually.

Figure 3C:
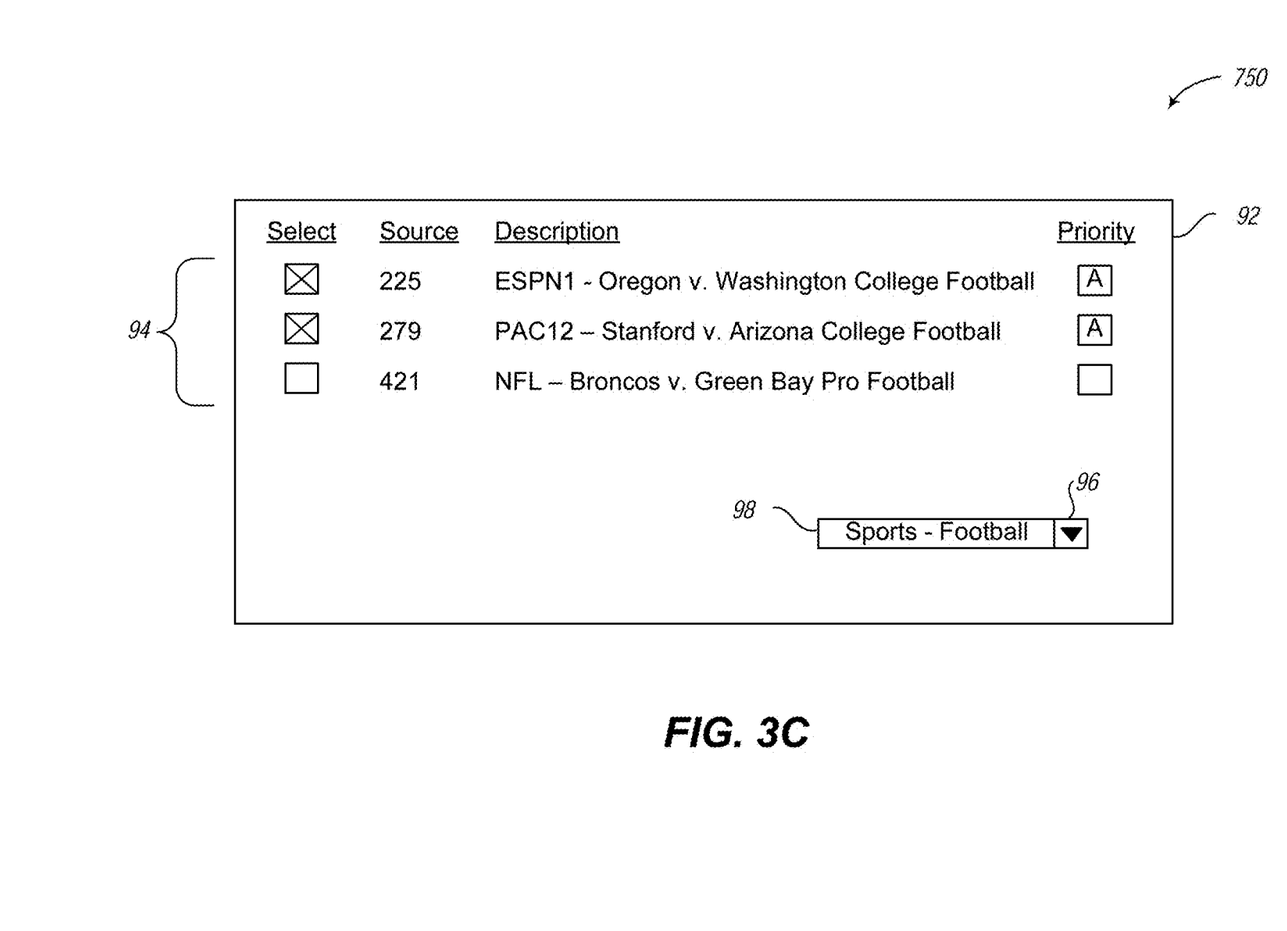
FIG. 3C contains illustration 750 that shows an implementation of the selection of a group of sports audiovisual content.

FIG. 3C contains diagram 750 that shows another non-limiting implementation of a user interface for selecting channels to be cycled through using the commercial-free audiovisual content system 32. The display area 92 shows that the user 20 has used the drop-down menu 96 to select "Sports—Football" 98 to identify audiovisual content sources that are displaying football games that are currently being displayed. As described in FIGS. 3A and 3B, the user 20 may then select or deselect individual content sources 94 to be cycled through using the commercial-free audiovisual content system 32. In one or more variations of this implementation, additional criteria identifying the ranges of days and time during which the commercial-free audiovisual content system 32 is activated may be specified by indicating, for example, one or more days of the week including frequently recurring days, and time ranges within or between those days.

Figure 4:
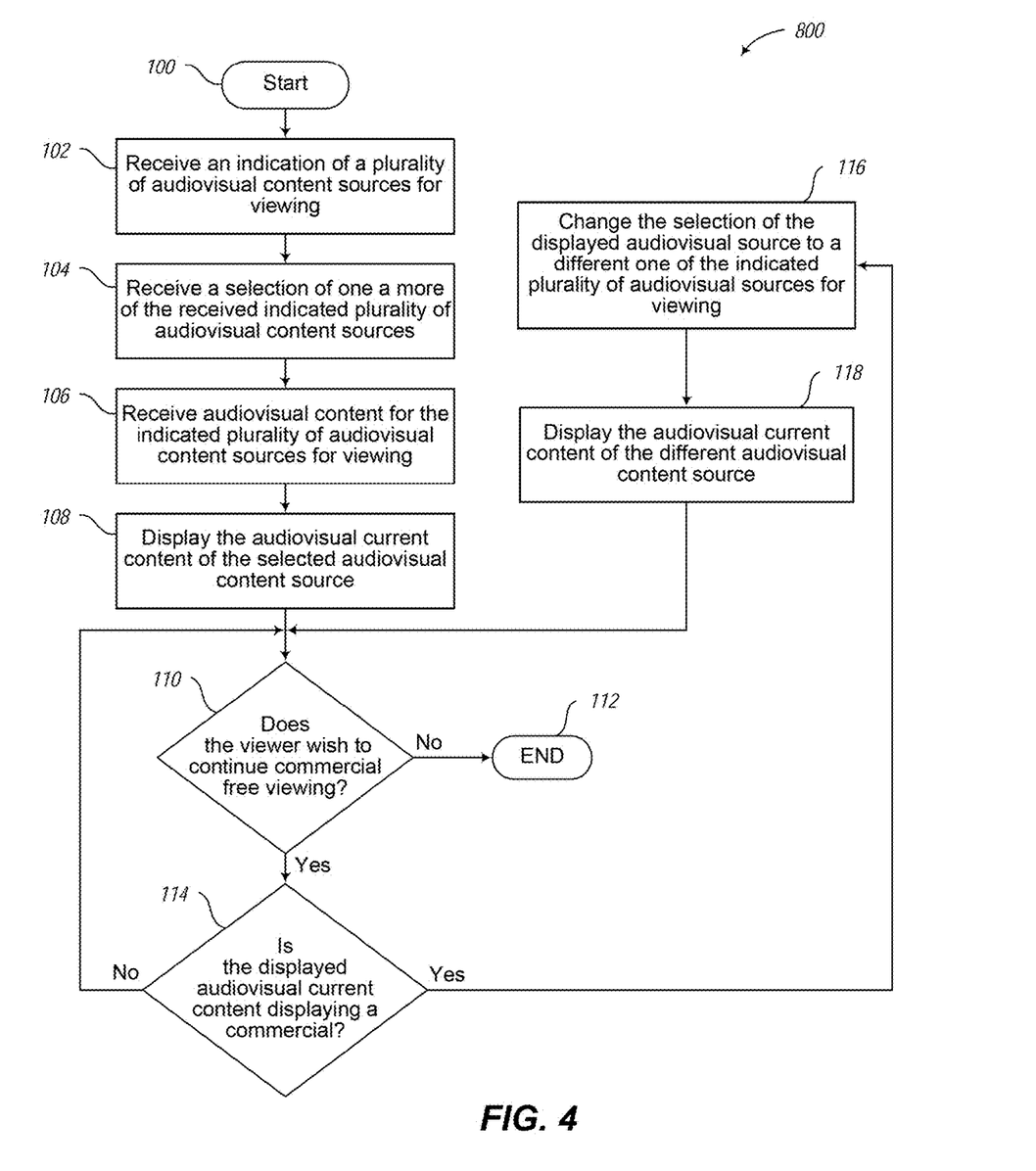
FIG. 4 contains flow diagram 800 that presents an implementation of an algorithm for selecting and displaying content for commercial-free viewing of audiovisual content.

FIG. 4 contains flow diagram 800 that shows one implementation of a method for providing a commercial-free audiovisual content. The method starts at step 100. At step 102, the method receives an indication of a plurality of audiovisual content sources for viewing. As discussed above, the indication of audiovisual content sources may be received by a selection from user 20 on the user interface screen. In other variations, the plurality may come from a user preference database 360 located at the user's 20 premises or located remotely and available via communications network 36. In still other variations, the indication of audiovisual content sources may come from other outside sources, such as from Internet sites such as social media sites or other Internet sites that implement a recommendation function for the user 20.

At step 104, the method receives a selection of one or more of the received indicated plurality of audiovisual content sources. This indication may come directly from the user 20, for example using remote control 22, from the user preference database 360, or from some other external recommendation function as described above. In one or more implementations, this step also receive a priority indication for a user 20 for each of the selected audiovisual content channels that will be used in later steps to determine which audiovisual content should be displayed to the user 20 when a commercial is encountered.

At step 106, the method receives audiovisual content for the indicated plurality of audiovisual content sources for viewing. This audiovisual content will be displayed to the user 20 on the television display 28. In one or more variations of one or more implementations, the audiovisual content of a plurality of audiovisual content sources will be displayed in a thumbnail icon on the television display 28.

At step 108, the method displays the audiovisual content of one of the selected audiovisual content sources, which may be referred to as "current content." In one or more variations of one or more implementations, thumbnail icons containing representations of each audiovisual content source, including the source that is displaying the current content, are displayed as well.

At step 110, the method determines whether the viewer wishes to continue commercial-free viewing. In one or more embodiments, no action or some specific action is taken by the user 20 to indicate that the user wishes to continue commercial-free viewing. If the user 20 does not wish to continue commercial-free viewing, then the method ends at step 112.

If user wishes to continue commercial-free viewing, then the method continues to step 114 where the method determines if the displayed audiovisual current content is displaying a commercial. If not, the method goes to step 110. If the current content is displaying a commercial, the method goes to step 116, where the method changes the selection of the displayed audiovisual source to a different one of the indicated plurality of audiovisual sources for viewing.

At step 118, the method displays the audiovisual current content of the different audiovisual content source, and the method goes to step 110.

Figure 5:
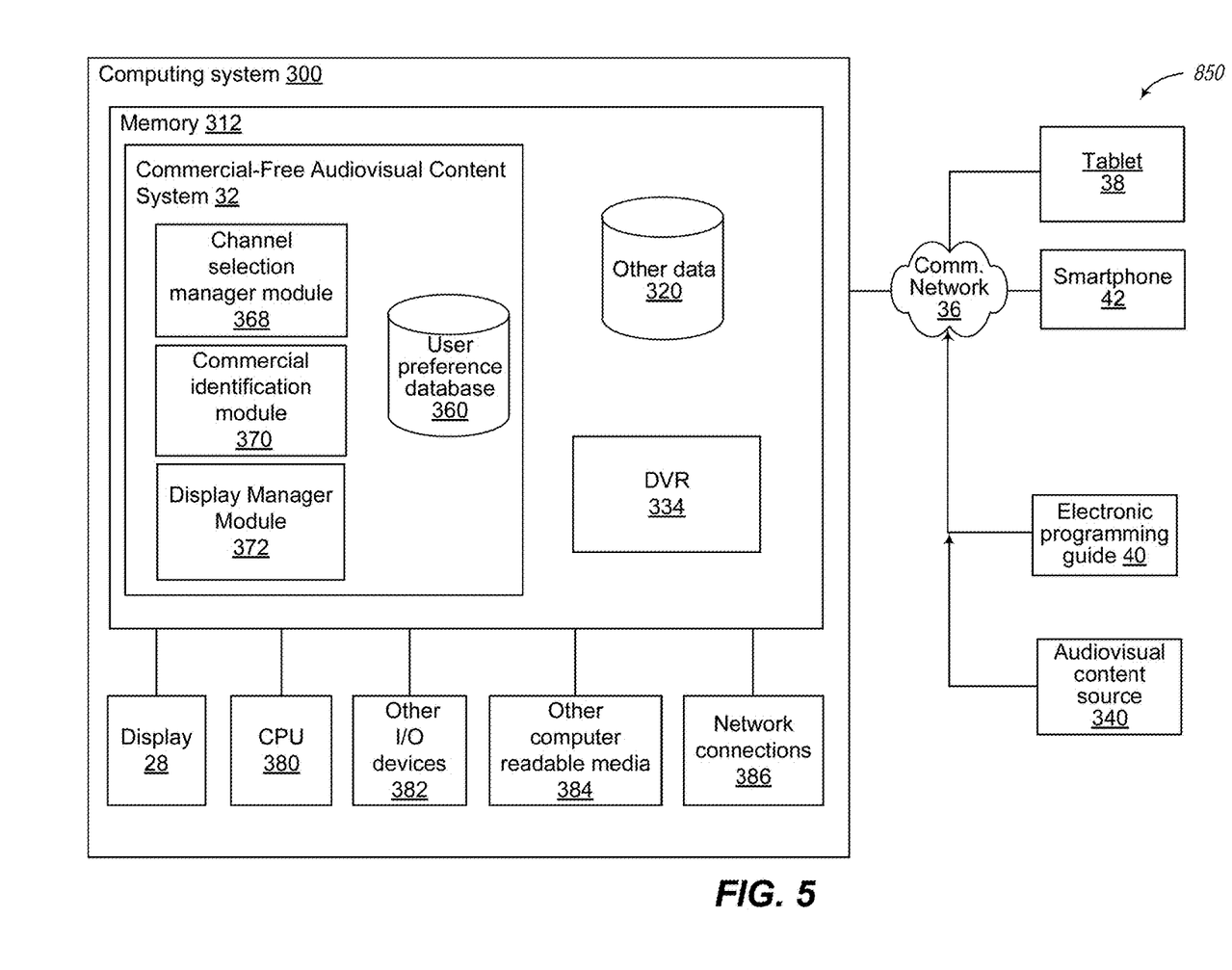
FIG. 5 contains diagram 850 that shows one implementation of a system and components for providing commercial-free viewing of audiovisual content.

FIG. 5 shows diagram 850 of one implementation of a computing system for implementing a commercial-free channel system 32. FIG. 5 includes a computing system 300 that may be utilized to implement commercial-free audiovisual content system 32 with features and functions as described above. One or more general-purpose or special-purpose computing systems may be used to implement the commercial-free audiovisual content system 32. More specifically, the computing system 300 may include one or more distinct computing systems present having distributed locations, such as within a set-top box, or within a personal computing device. In addition, each block shown may represent one or more such blocks as appropriate to a specific embodiment, or may be combined with other blocks. Moreover, the various blocks of the commercial-free audiovisual content system 32 may physically reside on one or more machines, which may use standard inter-process communication mechanisms (e.g., TCP/IP) to communicate with each other. Further, the commercial-free audiovisual content system 32 may be implemented in software, hardware, and firmware or in some combination to achieve the capabilities described herein.

In the embodiment shown, computing system 300 includes a computer memory 312, a display 28, one or more Central Processing Units ("CPUs") 380, input/output devices 382 (e.g., keyboard, mouse, joystick, track pad, LCD display, smart phone display, tablet and the like), other computer-readable media 384 and network connections 386 (e.g., Internet network connections or connections to audiovisual content distributors). In other embodiments, some portion of the contents of some or all of the components of the commercial-free audiovisual content system 32 may be stored on and/or transmitted over other computer-readable media 384 or over network connections 386. The components of the commercial-free audiovisual content system 32 preferably execute on one or more CPUs 380 to facilitate the selection of one or more sources of audiovisual content, and to manage the display of the audiovisual content to the user in such a manner that commercials that are part of the audiovisual content are not displayed to the user 20 on the television display 28. Other code or programs (e.g., a Web server, a database management system, and the like), and potentially one or more other data repositories 320, also reside in the computer memory 312, and preferably execute on one or more CPUs 380. Not all of the components in FIG. 5 are required for each implementation. For example, some embodiments embedded in other software do not provide means for user input, for display, for a customer computing system, or other components, such as, for example, a set-top box or other receiving device receiving audiovisual content.

In a typical embodiment, the commercial-free audiovisual content system 32 includes a channel selection manager module 368, a commercial identification module 370 and a display manager module 372. Audiovisual broadcast content, including video-on-demand 42, electronic programming guide information 40 and audiovisual content stored on digital video recorder 334 is received from an audiovisual content provider 340, which may be provided by a communications network 36. In one or more implementations, the commercial identification module 370 receives audiovisual content identified by the channel selection manager module 368 and determines if the current audiovisual content is displaying a commercial. The display manager module 372 uses information from this channel selection manager module 368 and the commercial identification module 370 to determine which audiovisual content channel to display to the user 20. In other implementations, this also includes determining and managing the location and the format of icons that represent additional audiovisual content channels that are available to the user 20 to view, as described above.

Other and/or different modules may be implemented. The commercial-free audiovisual content system 32 also, in some embodiments, contains the user preference database 360, which includes information to determine audiovisual content channels to be cycled through and presented to the user 20. In addition, the commercial-free audiovisual content system 32 interacts with communications network 36 in communicating with electronic programming guide 40 and audiovisual content source 340, in addition to other devices such as a tablet 46 or a smart phone 42.

The channel selection manager module 368 performs at least some of the functions as described with reference to FIGS. 1, 3A-3B and 4. In particular, the channel selection manager module 368 interacts with the user 20, the user preference database 360 and information from the electronic programming guide 40 to determine those audiovisual content channels and sources available to the user 20 for current viewing. As described above, the user 20 is able to use a number of different methods to select those audiovisual content sources that the user 20 wishes the system to cycle through. This way, the commercial-free audiovisual content system 32 is able to determine, at any particular time, those channels the user 20 wishes to cycle through and view in a commercial-free fashion.

The commercial identification module 370 performs at least some of the functions as described in FIGS. 1 and 4. The commercial identification module 370 analyzes audiovisual content, for example content coming from, e.g., DirecTV™ or Dish Network™ content providers, and determines whether the currently presented audiovisual content is a commercial. The commercial-free audiovisual content system 32 uses this information to indicate if the currently presented audiovisual content source is to be switched to another content source that is not currently displaying programming that contains a commercial.

The display manager module 372 performs at least some of the functions of managing how the audiovisual content is displayed to user 20, as described with reference to FIGS. 1, 2A, 2B and 4. The display manager module 372 receives data from the channel selection manager module 368 that identifies the audiovisual content channels that the user wishes to cycle through so that no commercials are viewed, and from the commercial identification module 370 that identifies when a commercial is being presented in current audiovisual content. In one or more implementations, the display manager module 372 displays current audiovisual content on the television display 28. In variations on these implementations, information may be displayed on other devices, such as on a second television display 26, a smart phone 44, or a tablet 46.

The display manager module 372 cycles through the identified audiovisual content sources and presents them to the user 20. In one or more implementations, the user 20 and/or information in the user preference database 360 is used to determine the priority given to each of the identified audiovisual content sources. This priority information is then used to determine which of the audiovisual content sources should be primarily displayed to the user 20. When the commercial-free channel system 32 determines that the currently displayed content is presenting a commercial, then, in one or more implementations, the display manager module 372 will immediately display the next highest priority audiovisual content source that is not showing a commercial.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for providing commercial-free channels comprising:
   a set-top box;
   a processor connected to the set-top box;
   a display connected to the set-top box;
   a communications network connected to the processor, and
   a non-transitory computer-readable memory communicatively coupled to the processor, the memory storing computer-executable instructions that, when executed, cause the processor to:
      display a content type menu including a plurality of categories of audiovisual content types;
      receive, from a user, a selection of a category of audiovisual content types from among the plurality of categories;
      display a content source menu including a plurality of audiovisual content sources currently displaying content associated with the selected category of audiovisual content types;
      receive, from the user, an indication of a plurality of audiovisual content sources for viewing from the content source menu;
      receive, from the user, priority information associated with the plurality of audiovisual content sources for viewing, the priority information indicating a priority level assigned to each of the selected audiovisual content sources for viewing, the priority level being selected from among a plurality of user-selectable priority levels;
      receive, from the communications network, audiovisual content for the indicated plurality of audiovisual content sources for viewing;
      display, on a same screen, current video content of each of the indicated plurality of audiovisual content sources for viewing;
      receive, from the user, a selection of a preferred one of the received indicated plurality of audiovisual content sources;
      in response to the selection of the preferred one of the received indicated plurality of audiovisual content sources:
         output current audio content only of the selected audiovisual content source; and
         display, in a larger area on the screen than the other indicated plurality of audiovisual content sources, current video content of the selected audiovisual content source;

if the displayed current video content of the selected audiovisual content source contains a commercial, then change the output of the current audio content to audio output of a different one of the indicated plurality of audiovisual content sources for viewing, based on the priority information, and display, in the larger area on the screen than the other indicated plurality of audiovisual content sources, current video content of the different one of the audiovisual content sources in the order of the highest priority as previously selected by the user, and if the audiovisual current content of all of the indicated plurality of audiovisual content sources contain commercials at the same time, then display, in the larger area on the screen than the other indicated plurality of audiovisual content sources, current video content of and switch to the audio output of the preferred one of the audiovisual content sources.

2. The system of claim 1 wherein the audiovisual content source is a channel of an audiovisual subscription service.

3. The system of claim 1 wherein the computer-executable instructions, when executed, further cause the processor to:

display a video icon for each of the indicated plurality of audiovisual sources; and display an indication associated with the video icon corresponding to the selected audiovisual content source.

4. The system of claim 1 wherein the indication of a plurality of audiovisual content sources for viewing further comprises a selection of sources received from the user.

5. The system of claim 1 wherein the indication of a plurality of audiovisual content sources for viewing further comprises a selection of sources normally watched by the user during a particular time period.

6. The system of claim 1, wherein receive, from the user, priority information associated with the plurality of audiovisual content sources for viewing includes:

receive, from the user, priority information indicating a same priority level assigned to two or more of the selected audiovisual content sources for viewing.

7. The system of claim 3, the system further comprising a secondary display device communicatively coupled to the set-top box, the non-transitory computer-readable memory storing computer-executable instructions that, when executed, cause the processor to:

receive from the user a second indication of one of the plurality of audiovisual sources for viewing, and display on the secondary display device the audiovisual content of the second indicated plurality of audiovisual sources.

8. A method for providing commercial-free channels comprising:

displaying a content type menu including a plurality of categories of audiovisual content types;

receiving, from a user, a selection of a category of audiovisual content types from among the plurality of categories;

displaying a content source menu including a plurality of audiovisual content sources currently providing content associated with the selected category of audiovisual content types;

receiving, from the user, an indication of a plurality of audiovisual content sources for viewing from the content source menu;

receiving, from the user, priority information associated with the plurality of audiovisual content sources for viewing, the priority information indicating a priority level assigned to each of the selected audiovisual content sources for viewing, the priority level being selected from among a plurality of user-selectable priority levels;

receiving, from the communications network, audiovisual content for the indicated plurality of audiovisual content sources for viewing;

displaying, on a same screen of a display device, current video content of each of the indicated plurality of audiovisual content sources for viewing;

receiving, from the user, a selection of a preferred one of the received indicated plurality of audiovisual content sources;

in response to the selection of the preferred one of the received indicated plurality of audiovisual content sources:

outputting current audio content only of the selected audiovisual content source; and displaying, in a larger area on the screen than the other indicated plurality of audiovisual content sources, current video content of the selected audiovisual content source;

if the displayed current video content of the selected audiovisual content source contains a commercial, then changing the output of the current audio content to audio output of a different one of the indicated plurality of audiovisual content sources for viewing, based on the priority information, and displaying, in the larger area on the screen than the other indicated plurality of audiovisual content sources, current video content of the different one of the audiovisual content sources; and if the audiovisual current content of all of the indicated plurality of audiovisual content sources contain commercials at the same time, then displaying in the larger area on the screen than the other indicated plurality of audiovisual content sources, current video content of and switch to the audio output of the preferred one of the audiovisual content sources.

9. The method of claim 8 wherein the audiovisual content source is a channel of an audiovisual subscription service.

10. The method of claim 8, further comprising:

displaying a video icon for each of the indicated plurality of audiovisual sources; and displaying an indication associated with the video icon corresponding to the selected audiovisual content source.

11. The method of claim 8 wherein the indication of a plurality of audiovisual content sources for viewing includes a selection of sources received from the user.

12. The method of claim 8 wherein the indication of a plurality of audiovisual content sources for viewing includes a selection of sources normally watched by the user during a particular time period.

13. The method of claim 8, wherein receiving, from the user, priority information associated with the plurality of audiovisual content sources for viewing includes:

receiving, from the user, priority information indicating a same priority level assigned to two or more of the selected audiovisual content sources for viewing.

14. The method of claim 10, further comprising:

receiving from the user a second indication of one of the plurality of audiovisual sources for viewing, and displaying on a secondary display device the audiovisual content of the second indicated plurality of audiovisual sources.

15. A non-transitory computer-readable storage medium having stored contents that configure a computing system to perform a method, the method comprising:
- displaying a content type menu including a plurality of categories of audiovisual content types;
- receiving, from a user, a selection of a category of audiovisual content types from among the plurality of categories;
- displaying a content source menu including a plurality of audiovisual content sources currently providing content associated with the selected category of audiovisual content types;
- receiving, from the user, an indication of a plurality of audiovisual content sources for viewing from the content source menu;
- receiving, from the user, priority information associated with the plurality of audiovisual content sources for viewing, the priority information indicating a priority level assigned to each of the selected audiovisual content sources for viewing, the priority level being selected from among a plurality of user-selectable priority levels;
- receiving, from the communications network, audiovisual content for the indicated plurality of audiovisual content sources for viewing;
- displaying, on a same screen of a display device, current video content of each of the indicated plurality of audiovisual content sources for viewing;
- receiving, from the user, a selection of a preferred one of the received indicated plurality of audiovisual content sources;
- in response to the selection of the preferred one of the received indicated plurality of audiovisual content sources:
  - outputting current audio content only of the selected audiovisual content source; and
  - displaying, in a larger area on the screen than the other indicated plurality of audiovisual content sources, current video content of the selected audiovisual content source;
- if the displayed current video content of the selected audiovisual content source contains a commercial, then changing the output of the current audio content to audio output of a different one of the indicated plurality of audiovisual content sources for viewing, based on the priority information, and displaying, in the larger area on the screen than the other indicated plurality of audiovisual content sources, current video content of the different one of the audiovisual content sources; and
- if the audiovisual current content of all of the indicated plurality of audiovisual content sources contain commercials at the same time, then displaying in the larger area on the screen than the other indicated plurality of audiovisual content sources, current video content of and switch to the audio output of the preferred one of the audiovisual content sources.

16. The non-transitory computer-readable storage medium of claim 15 wherein the audiovisual content source is a channel of an audiovisual subscription service.

17. The non-transitory computer-readable storage medium of claim 15, the stored contents configuring a computer system to perform a method further comprising:
- displaying a video icon for each of the indicated plurality of audiovisual sources; and
- displaying an indication associated with the video icon corresponding to the selected audiovisual content source.

18. The non-transitory computer-readable storage medium of claim 15 wherein the indication of a plurality of audiovisual content sources for viewing includes a selection of sources received from the user.

19. The non-transitory computer-readable storage medium of claim 15 wherein the indication of a plurality of audiovisual content sources for viewing includes a selection of sources normally watched by the user during a particular time period.

20. The non-transitory computer-readable storage medium of claim 17, the stored contents configuring a computer system to perform a method further comprising:
- receiving from the user a second indication of one of the plurality of audiovisual sources for viewing, and
- displaying on a secondary display device the audiovisual content of the second indicated plurality of audiovisual sources.

* * * * *

UNITED STATES PATENT AND TRADEMARK OFFICE
CERTIFICATE OF CORRECTION

PATENT NO. : 9,973,813 B2  
APPLICATION NO. : 14/603837  
DATED : May 15, 2018  
INVENTOR(S) : Scott Michael Parker Page 1 of 1

It is certified that error appears in the above-identified patent and that said Letters Patent is hereby corrected as shown below:

On the Title Page

Item (72) Inventor:
"Scott Michael Parker, Aurora, CO (US)" should read, --Scott Michael Parker, Parker, CO (US)--.

In the Claims

Column 10, Lines 25-26 Claim 1:
"a communications network connected to the processor, and" should read, --a communications network connected to the processor; and--.

Column 11, Lines 10-11 Claim 1:
"the highest priority as previously selected by the user, and" should read, --the highest priority as previously selected by the user; and--.

Column 12, Lines 62-63 Claim 14:
"further comprising: receiving from the user a second indication of one" should read, --further comprising: receiving, from the user, a second indication of one--.

Column 14, Lines 37-38 Claim 20:
"further comprising: receiving from the user a second indication of one" should read, --further comprising: receiving, from the user, a second indication of one--.

Signed and Sealed this  
Tenth Day of July, 2018

Andrei Iancu  
*Director of the United States Patent and Trademark Office*